United States Patent [19]

Udo et al.

[11] 4,202,015
[45] May 6, 1980

[54] VIDEO PROJECTION SYSTEM

[76] Inventors: Henry D. Udo, 549 Poinsettia St., Chula Vista, Calif. 92011; Lawrence F. Pickett, 5941 Steeplechase Rd., Bonita, Calif. 92002

[21] Appl. No.: 872,220

[22] Filed: Jan. 25, 1978

[51] Int. Cl.$^2$ .......................... H04N 5/64; H04N 5/74
[52] U.S. Cl. ..................................... 358/237; 358/254
[58] Field of Search ............. 358/237, 238, 239, 250, 358/254; 312/7 TV; D6/181; D14/77, 79, 82, 83, 1, 99; 353/119, 122

[56] References Cited

U.S. PATENT DOCUMENTS

| | | | |
|---|---|---|---|
| 3,536,832 | 10/1970 | Zipse et al. | 358/250 |
| 3,820,885 | 6/1974 | Miller | 353/122 |
| 3,943,282 | 3/1976 | Muntz | 358/238 |
| 4,021,105 | 5/1977 | Schubach | 358/254 |
| 4,074,322 | 2/1978 | Cammilleri | 358/237 |

FOREIGN PATENT DOCUMENTS

| | | | |
|---|---|---|---|
| 1357719 | 3/1964 | France | 358/254 |
| 581916 | 9/1958 | Italy | 312/7 TV |

Primary Examiner—John C. Martin
Assistant Examiner—Joseph A. Orsino, Jr.
Attorney, Agent, or Firm—Brown & Martin

[57] ABSTRACT

A video projection system for enlarging and projecting the image or picture from a television receiver includes a mounting system including a cradle having a frame for securing to the television receiver and including support members for supporting the television receiver for pivoting about a horizontal axis with the cradle mounted on a base member for pivotal movement about a vertical axis. A projector is mounted on the face of the television receiver and includes a mirror and enlarging lens such that a proper image is projected onto a front viewing screen when the television is turned either face up or face down with the bottom of the receiver toward the screen when face up and the top of the receiver toward the screen when face down for front projection. For rear projection, a mirror is positioned between the enlarging lens and the back projecting screen with the television receiver turned face down and covered by the projection box.

6 Claims, 9 Drawing Figures

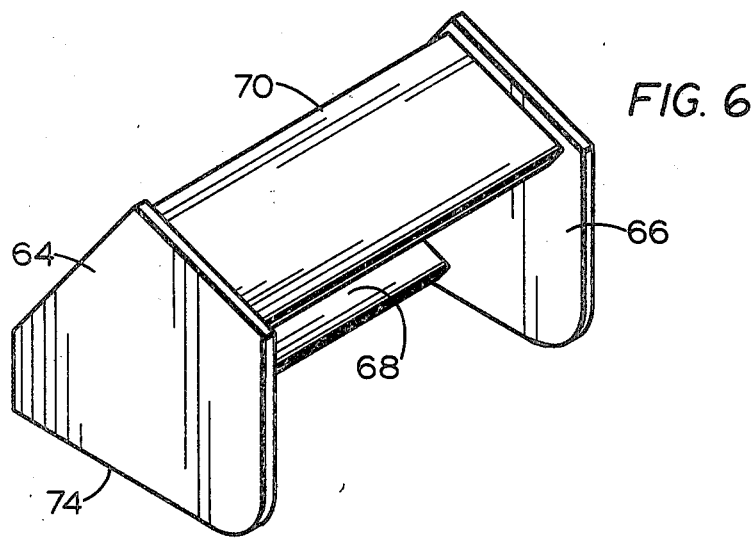
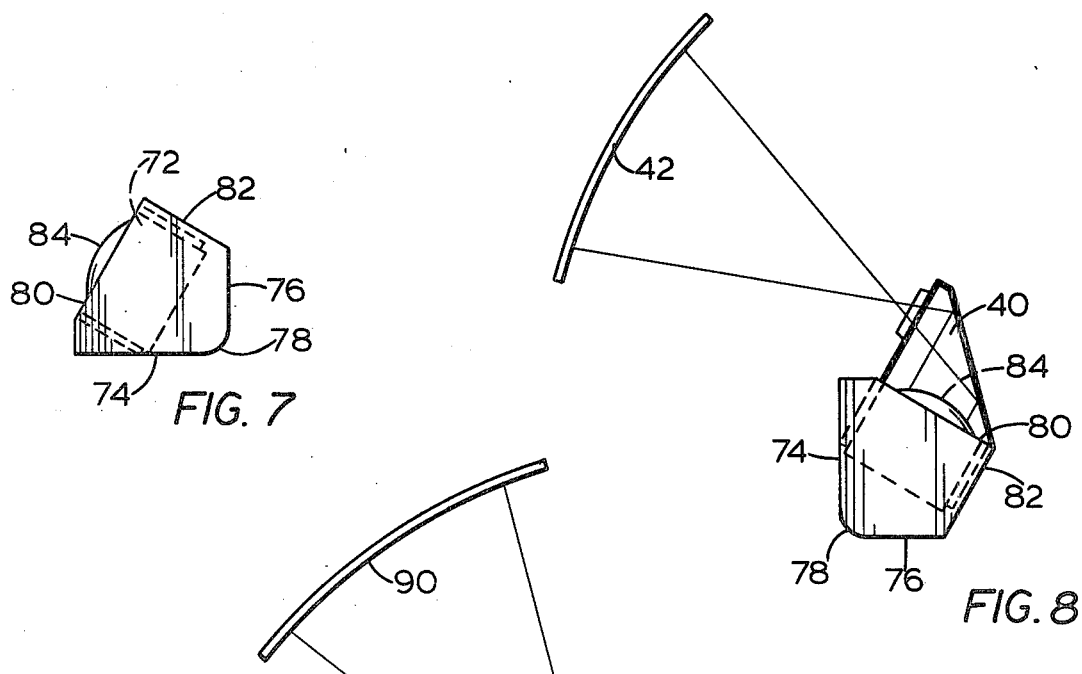
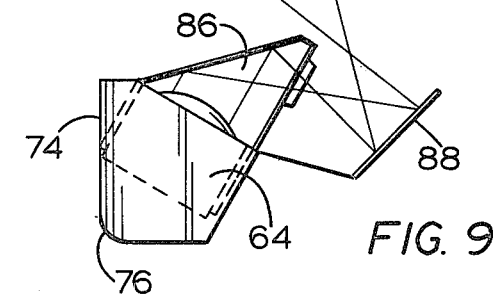

VIDEO PROJECTION SYSTEM

BACKGROUND OF THE INVENTION

The present ivention relates to projection systems and pertains particularly to a video enlargement and projection system.

Many systems have been proposed for the enlargement and projection of a video image from a television receiver. Most of such systems require modification of the receiver including modification of the circuit to invert the image in the picture tube and projection system for projecting the image onto a screen. Two major drawbacks of such systems are that, first, it requires a modification of the television receiver resulting in loss of warranty on the receiver, and secondly, it requires such modification of the television receiver that it cannot be viewed as a television receiver in the normal manner. Other disadvantages of such prior systems is that they are complicated and expensive.

One proposed system which overcomes some of the major disadvantages of the prior art is U.S. Pat. No. 4,021,105, issued May 3, 1977 to Schubach. The system disclosed in this patent has the capability of projecting an image on a screen in an upright position without modifying the circuit of the television receiver and also without altering the television for conventional viewing.

The major disadvantage of that system, however, is that it is cumbersome and requires undue handling and manipulation of the receiver within the support system.

It is therefore desirable to have a simple and inexpensive video projection system that overcomes the above problems of the prior art.

SUMMARY AND OBJECTS OF THE INVENTION

It is the primary object of the present invention to overcome the above problems of the prior art.

Another object of the present invention is to provide a simple and inexpensive video projection system for projecting an image from a conventional unmodified television receiver onto a viewing screen.

Another object of the present invention is to provide a simple and inexpensive video projection system that enlarges and projects the image from a conventional television set without requiring the modification of the set and including supporting means for easily and conveniently manipulating the television set for enlarged projection and for conventional viewing.

In accordance with the primary aspect of the present invention, a video projection system includes a support apparatus comprising a cradle for mounting a television receiver for pivotal movement about a horizontal axis between face up and face down positions for enlarged projection and for a horizontal face out position for normal viewing and including a projector having a simple lens and mirror system for projecting the image from the television receiver tube onto a viewing screen without modification of the television receiver.

BRIEF DESCRIPTION OF THE DRAWINGS

The above and other objects and advantages of the present invention will become apparent from the following description when read in conjunction with the drawings, wherein:

FIG. 6 is a perspective view of an alternate embodiment of a support.

FIG. 7 is a side elevational view of the support of FIG. 6 in position for normal viewing.

FIG. 8 is a side elevational view of the support of FIG. 6 in position for enlarged projection.

FIG. 9 is a side elevational view of the support of FIG. 6 positioned for projection on a front projecting screen.

DETAILED DESCRIPTION OF PREFERRED EMBODIMENTS

Figure 1:
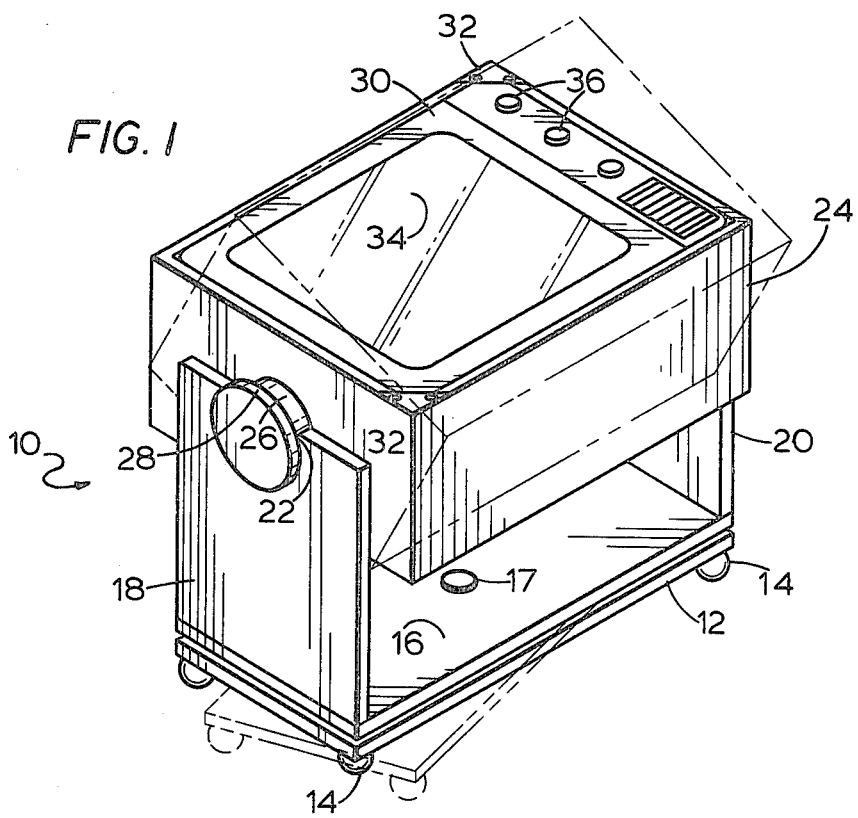
FIG. 1 is a perspective view of the support and mounting system in accordance with the invention.

Turning to the drawings, particularly to FIG. 1, there is illustrated mounting and supporting structure for a television set in accordance with the present invention designated generally by the numeral 10. This mounting and support structure includes a base member 12 having a generally flat rectangular configuration and having a plurality of casters or the like mounted at, for example, the four corners thereof for supporting and permitting rolling of the structure along a floor. A yoke assembly comprising a base member 16 of substantially the same size and configuration as member 12 is pivotally mounted on the base member 12 by a suitable pin means 17 at the center thereof for pivotal movement about a vertical axis. The yoke member includes a pair of side vertical members 18 and 20, each respectively including a somewhat semi-circular support or trunion bearing, only one of which is shown at 22. A cradle structure including a generally rectangular frame member 24 having a depth and dimensions for completely encircling and receiving a television receiver of, for example, the portable type, includes a pair of journal members at each end thereof one of which is shown and designated by the numeral 26 and having suitable flange at 28 for assisting and retaining the structure within the yoke assembly. This essentially defines a trunion type mounting arrangement for supporting the television set for pivotal movement about a horizontal axis.

A television set 30 is securely mounted within the frame 24 and held in place therein in any suitable manner, such as for example, by means of a pair of brackets or the like 32 secured to opposite corners of the frame 24 such as by screws or the like. Similar retaining brackets may be used on the back of the frame for holding the receiver within the frame when tilted face up. The television set is thus securely retained within the mounting frame 24 for being freely pivoted to face up and face down positions. The television set includes the usual viewing screen 34 comprising the face of the video tube and a suitable control panel including, for example, control knobs 36 located for controlling the television set. Thus, preferably, the front and back of the frame 24 are open, the front being open to permit viewing and projection from the screen 34 and the rear being open to assist in dissipating heat from the television receiver housing. With this arrangement, the television receiver 30 can be quickly and conveniently tilted between face up and face down positions.

The above described support structure in combination with a projector designated generally by the numeral 40 and a viewing screen designated generally by the numeral 42, constitute the basic components of the present system. By a select and novel arrangement of these particular components, the applicant has come up with a system which is simple, inexpensive and effective to provide a system that can project and magnify the image from the screen of a conventional television set onto a viewing screen without any internal modification of the television receiver.

The projector itself comprises a fairly simple three dimensional open triangular shaped box having a generally rectangular front or face 44 in which is mounted a simple enlarging lens 46. The front panel or face 44 is connected to a pair of side walls 48 and 50 and a sloping back wall 52. The projecting housing includes an open bottom for fitting over and receiving the screen of the television receiver. The box includes a reflecting mirror 54 mounted on a generally 45° angle for projecting the image from the face of the tube at 34 onto or through the enlarging lens at 46. The lens 46 may be either a single or multiple element lens and preferably includes an adjustment such as for focusing onto the screen 42.

Figure 2:
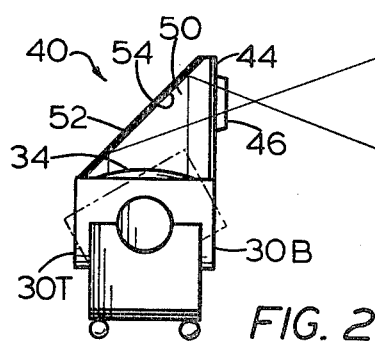
FIG. 2 is a side elevational view showing the system in one mode of enlarged projection.
Figure 3:
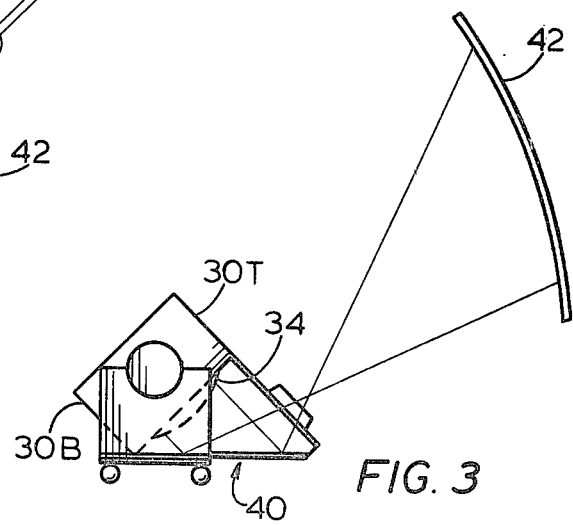
FIG. 3 is a side elevational view showing the system of the present invention in an alternate mode of enlarged projection.

In the embodiment as illustrated in FIG. 2, the arrangement of the components of the system is that for viewing the screen from the front thereof or for a front projection onto the screen. The screen 42 has a reflecting face on which the image is projected with the projection system thus projecting the image onto the front or the viewing side of the screen. With this arrangement, the television receiver is turned face up, as shown in FIG. 2, with the bottom toward the screen 42. For convenience of understanding the arrangement of the components, the bottom of the television receiver is designated 30B and the top of the receiver is designated 30T. Thus, with this designation, an alternate arrangement is shown in FIG. 3. With this arrangement, the top 30T of the television receiver is toward the screen 42 and the bottom 30B is away from the screen. The face of the television or screen 34 is somewhat downward with the projecting unit 40 resting within or on the surface of member 16 and the open end thereof registering with the screen 34. This arrangement of the system is particularly adaptable for use or particularly preferred for use with television receivers having the control knobs on the side thereof. In such an instance, an opening would be provided in the side of the frame 24 for providing access to the control knobs. In either arrangement, it will be appreciated that the image from the television screen 34 is projected through the projector 40 and enlarged and projected onto a screen 42 for viewing. The image is projected upright in its proper position on the screen 42.

Figure 4:
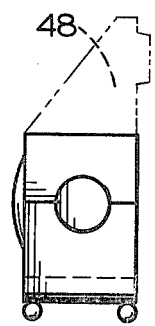
FIG. 4 is a side elevational view showing the system of the present invention in position for normal television viewing.

With this system the television set can be easily and quickly converted from the projection configuration to the normal viewing configuration, as shown in FIG. 4. The television set or receiver need simply be pivoted about the horizontal axis to the face outward position and turned to face the viewer, such as shown in FIG. 4. For convenience, the support assembly includes both vertical and horizontal pivot axis such that the face of the screen may be turned to face any suitable horizontal direction. Preferably the screen 42 is of a somewhat curved configuration to reduce distortion of the projected image.

Figure 5:
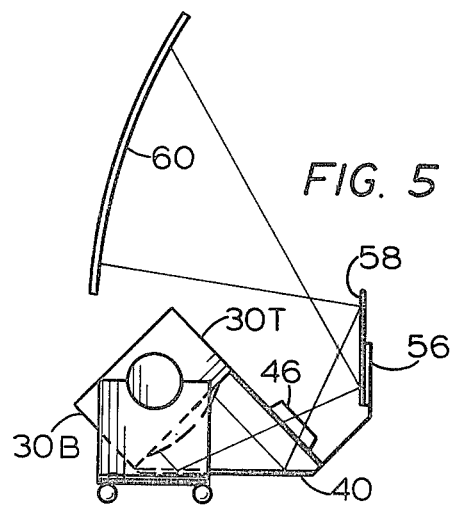
FIG. 5 is a side elevational view of an alternate embodiment showing the system for back projection on a viewing screen.

An alternate embodiment or configuration of the invention for the projection of an image onto a screen of the rear projection type is illustrated in FIG. 5. In this embodiment, a suitable attachment, such as a bracket or the like, 56 is simply secured to the projector housing 40 and an additional mirror 58 placed at 45° to the lens 46 in front thereof. With this arrangement, the image is properly reversed and inverted back to the proper position to be projected on the backside of a front viewing screen 60. Again, with this arrangement, the television receiver need not be modified in any way whatsoever. With this modification, the television 30 is simply placed behind the screen 60 facing away from the screen and slightly facing downward with the projector 40 receiving the image from the face of the television receiver and projecting it by way of the combination of mirrors and lens to the back of the screen 60. The screen or image is then viewed from the front or face thereof, i.e. from the left as shown in FIG. 5. Again, no modification is required in the television receiver unit itself.

In summary, the applicant has provided a simple, inexpensive and convenient video projection system which readily and conveniently mounts a television receiver for both conventional viewing and for enlarged projection viewing without any alternation whatsoever in the video unit itself. Moreover, the arrangement is such that the television set is mounted for quick and convenient manipulation to the respective viewing positions without the necessity of shifting the video receiving unit about in its mounting.

An alternate embodiment of support cradle designated generally by the numeral 62 is illustrated in FIG. 6. This cradle comprises a pair of identical end panels 64 and 66 connected together by top panel 68 and a bottom panel 70 defining a generally rectangular frame for receiving and securing a television receiver 72 therein. The receiver as in the previous embodiment is secured in the frame against relative movement thereto. The housing of the television receiver may be secured in the frame in any suitable manner (not shown).

The end panels 62 and 66 (only one of which reference numerals will be supplied) are each constructed to have a generally straight lower support surface 74 and a generally straight back surface 76 which is preferably approximately 90° to the lower surface and connected by a curved portion or surface 78, essentially defining a rocker. The curved or rocker portion should have a radius sufficiently large to permit the receiver to be easily rocked back on its back as shown in FIG. 8.

The end panels are formed with a front sloping surface 80 and a slightly sloping top 82. The front is preferably sloped at an angle to permit the face 84 to be at the right viewing angle. It should be also at substantially right angles to the front 80. In any case, the top and bottom panels 70 and 68 should slope backward a slight amount so that the receiver will also be held in the frame by its own weight.

For normal television viewing the receiver 72 is supported in the cradle face outward generally horizontally and slightly upward as shown in FIG. 7. When it is desired to enlarge and project an image from the screen the unit is tilted backward with the face up as shown in FIG. 8. The bottom of the receiver is toward the screen, and the top of receiver toward the viewer. If the viewer stays in the same place, it will be necessary to rotate the receiver and cradle about the vertical axis.

This can be easily accomplished by sliding the unit about on surfaces 74 or 76 as though they were skids.

FIG. 8 illustrates the arrangement for projection onto a rear projection screen. In this arrangement a projection box 86 is provided with a mirrir 88 which reverses the image and projects it on the back of screen 90. The viewer sees the true image on the front of the screen on the left, as viewed in FIG. 9.

While I have illustrated and described my invention by means of specific embodiments, it is to be understood that numerous changes and modifications may be made therein without departing from the spirit and scope of the invention as defined in the appended claims.

Having described our invention, we now claim:

1. A video projection system for projecting an enlarged video image from a television receiver onto a screen, comprising in combination:
    a mounting cradle comprising a generally rectangular box-like frame for extending snugly around the top, bottom and two sides for receiving and securing the housing of a television receiver with the face of the receiver defined by the screen and face thereof exposed and directed outward, and including support means including a base and a pair of vertically extending support members including trunion means for supporting said frame for pivotal movement about a horizontal axis,
    a television receiver securely mounted in said frame with the face thereof directed outward for pivoting about said horizontal axis between face up and face down positions for projection of an enlarged image and to an outward position for normal viewing, and
    projection means including enlarging lens means for mounting on the face of said receiver for enlargement and projection of an image from said receiver to a screen, said receiver being pivoted to a selected one of a face up position with the bottom of said receiver toward said screen, and a face down position with the bottom of the receiver away from the screen for projecting an enlarged true image on a vertical viewing screen,
    wherein said projection means is supported on the face of said television receiver and covering the screen thereof during face up projection and is supported on said base and covering the screen of said television receiver during face down projection.

2. The video projection system of claim 1, wherein said projection means includes a pair of mirrors and a single enlarging lens between said mirrors for back projection on a viewing screen.

3. The video projection system of claim 1, wherein said generally rectangular frame extends solely around the top, bottom and two sides of the housing of the television receiver leaving the front and back thereof open, and
    said television receiver fits snugly within said frame.

4. The video projection system of claim 1, wherein said mounting cradle includes trunion means for supporting said frame for pivotal movement about a horizontal axis.

5. A video projection system for projecting an enlarged video image from a television receiver onto a screen, comprising in combination:
    a mounting cradle comprising a generally rectangular frame for receiving and securing the housing of a television receiver, and including support means including a pair of spaced apart vertically extending rocker members for supporting said frame for pivotal movement about a horizontal axis,
    a television receiver securely mounted in said frame for pivoting about said horizontal axis for pivotal movement between a face forward viewing position for normal viewing and a face up projection position for projection of an enlarged image, and
    projection means including enlarging lens means for mounting on the face of said receiver for enlargement and projection of an image from said receiver to a screen, said receiver being pivoted to a face up position for projecting an enlarged true image on a viewing screen,
    wherein said rectangular frame includes a pair of side panels each having a pair of straight support surfaces extending at a substantially right angle to one another and a curved surface connecting said support surfaces and defining said rockers.

6. The video projection system of claim 5, wherein said rectangular support frame supports said television receiver at a slight angle upward from the horizontal for normal viewing.

* * * * *